INVENTORS:
SIEGFRIED BRAUN
FRIEDRICH RUPPEL
HEINZ SCHIPPERS

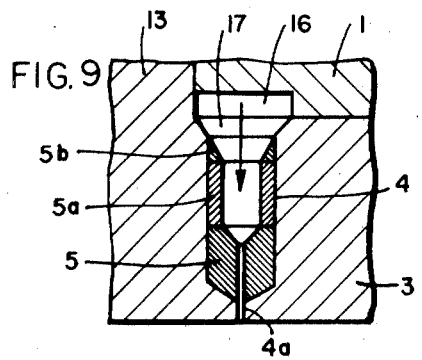
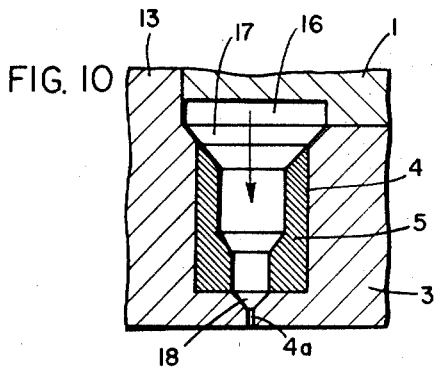
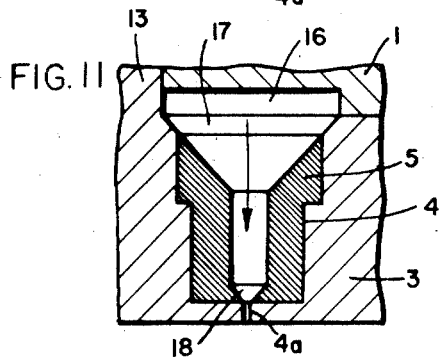
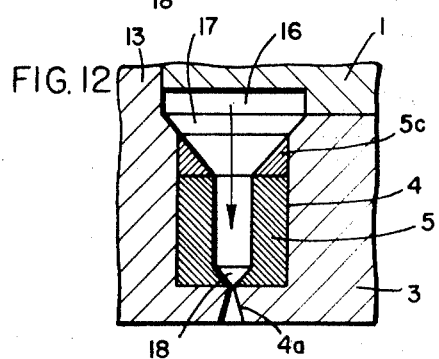
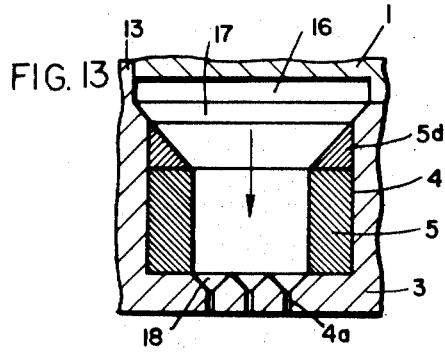
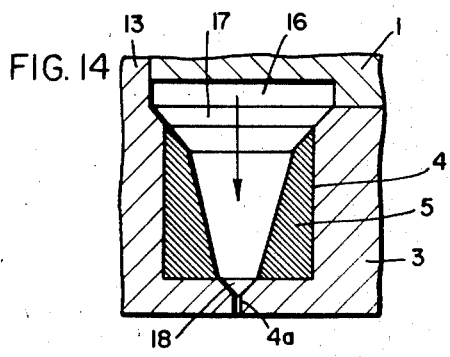
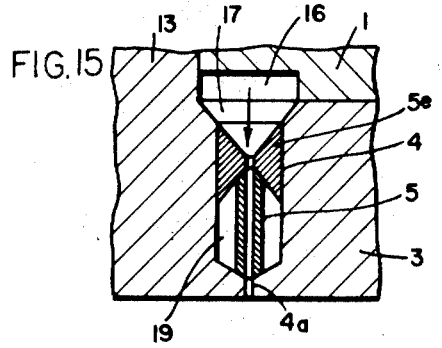
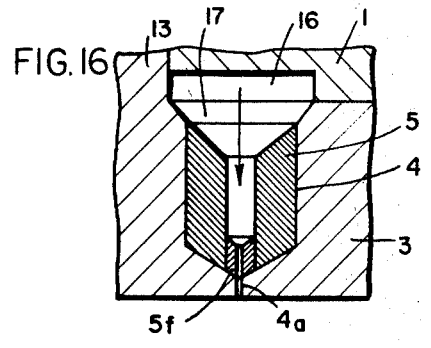

United States Patent Office 3,516,120
Patented June 23, 1970

3,516,120
EXTRUSION DIE FOR UNDERWATER GRANULATOR
Siegfried Braun, Wupperfurth, Friedrich Ruppel, Wuppertal-Langerfeld, and Heinz Schippers, Remscheid-Lennep, Germany, assignors to Barmag Barmer Maschinenfabrik Aktiengesellschaft, Wuppertal, Germany
Filed Dec. 6, 1967, Ser. No. 688,511
Claims priority, application Germany, Dec. 14, 1966, B 90,300; May 2, 1967, B 92,331
Int. Cl. B29f 3/00
U.S. Cl. 18—12
19 Claims

ABSTRACT OF THE DISCLOSURE

An extrusion die for an underwater granulator having the usual distributor block in which a synthetic thermoplastic polymer is maintained in molten form, a nozzle plate attached to the block and containing a number of elongated bores or channels through which the molten polymer is extruded to emerge at the face of the die for contact with a cooling fluid thereon, e.g. a bath or spray of water, and cutting means in close proximity to the die face to cut the extruded polymer into granules, wherein plugging of the extrusion bores and/or improper cooling of the extruded plastic is prevented by an inner liner or bushing composed of a heat-resistant material having low heat conductivity applied to at least a portion of the length of each of the extrusion bores.

---

Figure 1:
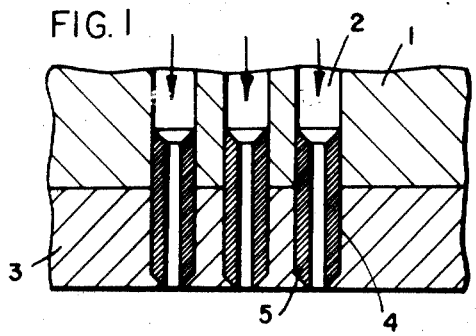

This invention is concerned with an improvement in the construction of the extrusion die as commonly used for so-called underwater granulation in which a molten thermoplastic polymer is extruded in the form of a plurality of noodles or strands from the face of the die which is located underwater or which is at least continuously wetted by a stream or spray of water or some other suitable cooling medium. Cutting means, usually in the form of one or more rotating knives and mounted so that the knife blade sweeps across the face of the die, causes the extruded and cooled polymer to be cut into more or less uniform granules or pellets. This general arrangement of such cutting apparatus as well as the extruder which supplies the molten polymer are preserved for purposes of the present invention which is directed to a specific improvement in the extrusion die and, more particularly, to means for improving the manner in which the extruded polymer is cooled for cutting.

Many extrusion dies suitable for use in an underwater granulator have been suggested in the prior art. In order to be able to produce a satisfactory granulate, it is of course essential to maintain the thermoplastic material above the temperature at which it solidifies until it exits or emerges from the extrusion openings at the face of the die. However, this requirement is quite difficult to meet with existing dies because the molten plastic material must be cooled immediately upon emerging at the face of the die and this requires a strongly acting cooling medium such as a bath cooled to a very low temperature or a stream of the cooling medium flowing over or directed against the face of the die and having a strong cooling capacity. The temperature differential or temperature decrease between the nozzle plate and the cooling medium must therefore be quite high.

On the other hand, in previously known underwater granulating devices, an attempt has been made to continuously replace the heat carried off by the cooling medium from the face or nozzle plate of the die. Otherwise, this face or nozzle plate tends to become quickly overcooled to the point that the polymer begins to solidify within the nozzle bores and causes plugging and improper extrusion. By intensive heating of the nozzle plate, this problem can be avoided to some degree, but such additional supply of heat to the nozzle plate seldom yields the desired result of protecting the polymer to be granulated from a premature solidification. Furthermore, with this higher heat performance, i.e. a higher temperature differential between the nozzle plate and the cooling medium, there is a considerably higher expenditure of energy with a correspondingly higher cost of extrusion and granulation.

It is therefore an object of the present invention to improve the construction of the extrusion die for underwater granulators in such a manner that all plastic or synthetic polymer materials capable of being melted, extruded, cooled and granulated, including those with relatively high melting points, will flow smoothly through the nozzle bores, holes or openings of the extrusion die without prematurely solidifying therein. Another object of the invention is to improve the construction and arrangement of the extrusion die so as to reduce the amount of cooling agent or the consumption of heat required per unit weight or volume of the plastic material being extruded and granulated. Still another object of the invention is to provide an extrusion die which permits excellent control over the cooling or solidification of the plastic material so as to achieve a granulate which is relatively free of sharply cut edges and therefore is capable of flowing more freely. These and other objects and advantages will become more apparent upon consideration of the following detailed disclosure taken in conjunction with the accompanying drawings wherein:

FIGS. 1–8 are partial cross-sectional views taken through the axis of the bore or a group of bores in an otherwise conventional extrusion die, illustrating various useful embodiments of the invention; and FIGS. 9–16 are similar partial cross-sectional views of an especially preferred set of embodiments of one or more nozzle bores of the extruder constructed with an inner liner offset from the face of the nozzle plate.

It has now been found, in accordance with the invention, that the serious disadvantages of prior extrusion dies can be overcome and a surprising improvement can be achieved in the extrusion process and the resulting granulate by the combination of (A) a conventional die having a channeled distributor portion in which a synthetic thermoplastic material is maintained in its molten form and a nozzle plate portion containing a plurality of bores in fluid connection with at least one distributor channel for extrusion of the molten thermoplastic material through said bores so as to emerge at the face of the die where it is solidified by a liquid cooling medium and granulated by cutting means in close proximity to the die face, with (B) an inner liner extending over at least a portion of the length of each extrusion bore, this liner consisting of a heat-resistant material having a high melting point of at least 750° C. and a low value of heat conductivity, i.e. a relatively high capacity for heat insulation. Particularly good results are achieved where this liner is offset a short distance from the extrusion face of the nozzle plate, preferably so that the unlined terminal portion of the nozzle bore has an axial length of approximately one and one-half to three times its diameter.

The heat-resistant inner liner for each of the extrusion bores can be selected from a wide variety of readily available substances but must have a high melting point of at least 750° C., preferably above about 1250° C., and a low value of heat conductivity, e.g. a coefficient of thermal conductivity ($\lambda$) of not more than 15 kcal./m. hr. ° C. and preferably below about 12 kcal./m. hr. ° C. (For purposes of definition, the abbreviations of the units of measurement of the coefficient of thermal or heat conductivity have the following meanings: kcal.=kilocalories;

m.=meter; hr.=hour; and ° C.=degrees centigrade.) The liner material should also be sufficiently strong to withstand the extrusion pressures under normal extrusion temperatures of around 300° C., and the inner liner is preferably formed so as to have a relatively smooth inner surface.

Among those substances which are useful as the inner liner, one can include suitable refractory materials such as fused silica, fused silicates and fused aluminum oxides, such as quartz, feldspar, corundum and similar minerals having a silicate and/or aluminum oxide basis. A very heat-resistant glass such as Jena glass, sometimes referred to as "Jena ware," is especially suitable in view of its low heat conductivity of approximately 0.9 kcal./m. hr. ° C. Other readily available heat-resistant glasses of high silica content include Vycor glass, e.g. with a silica content of 96%, a small proportion of boron oxide and traces of the oxides of aluminum, sodium, iron and arsenic, the resulting glass exhibiting a very low thermal expansion, a softening point of approximately 1500° C., a temperature limit in service of about 900° C., and a coefficient of thermal expansion of about 0.9 kcal./m. hr. ° C. Porcelain is also a suitable ceramic insulating material as well as the refractories or high silica content glasses listed above, and one skilled in this art can readily select a substance having the desired properties and apply it as a liner by known procedures.

For example, the fusible refractory or ceramic substances can be applied as a coating or inner lining on the inner surface of the extrusion bores, e.g. by pouring and/ or fusing the desired material in place. However, it is preferable to preform or precast a tubular inner liner which can then be readily inserted into the extrusion bores and held in place by the particular means of construction or even by using a refractory cement for permanent installations.

In addition to the above-noted heat-resistant substances of low heat conductivity, it is also feasible to use metallic liners or tubular inserts which have a sufficiently low coefficient of thermal conductivity. In particular, the so-called heat-resistant high alloy chromium-nickel steels are quite useful and can be easily formed into any number of desirable shapes. See, for example, page 209 of "Tool Engineers Handbook," American Society of Tool Engineers, McGraw-Hill Book Co., 1st Ed. (1949). These are the so-called "austenitic steels" or "austenitic stainless steels," especially those of type 25–12 (22–28% chromium, 12–16% nickel) which are known to have relatively low heat conductivity, i.e. below about 15 kcal./m. hr. ° C.

When using the inner liner or tubular insert composed of one of these substances in accordance with the invention, it has now become evident that the heat content, which the molten plastic possesses as it is conducted from the customarily heated distributor portion of the die through the nozzle plate, is sufficiently high to permit a continuous fluid flow of the melt through the nozzle openings or bores without premature solidification. This solidification in the bores can be prevented even when operating at relatively high flow speeds or extrusion velocities. The exact size and shape of the inner liner or tubular insert naturally depends on the extrusion temperature, i.e. the temperature of the melt as it leaves the heated distributor portion, as well as the particular insulating substance being employed. However, since the operating conditions generally remain constant for any particular thermoplastic material being extruded and since the heat conductivity of the liner is known, it is possible to calculate the heat loss over the length of the extrusion bore so as to carefully design the inner liner or tube for accurate control of the melt temperature. Such an extremely accurate control of temperature has not been possible in prior devices of this type.

In conventional underwater granulators, it is quite common for the nozzle plate and heated distributor portion to be mounted in direct contact with each other. Heat is then dissipated at the nozzle plate so that the adjacent zone of the distributor portion often lies only slightly above the solidification or fusion point of the molten plastic material. Consequently, as a preferred embodiment of the invention, the inner liner or tubular insert of low heat conductivity is positioned so as to extend beyond the nozzle plate into the distributor portion by making a suitable alteration in the construction of the extrusion die for the reception of this projecting end of the tubular insert.

It is also helpful for purposes of the invention to insert a heat insulating layer or gasket between the nozzle plate and the distributor portion of the extrusion die, thereby further reducing the heat loss from the distributor portion. Such a gasket can be readily constructed of any conventional heat insulating sheet or laminated material, preferably with a thermal conductivity of less than 1.0 kcal./m. hr. ° C., and especially below about 0.5 kcal./m. hr. ° C.

In another preferred embodiment of the invention, the front surface or extrusion face of the nozzle plate swept by the cutting knives can be constructed as a reinforced layer or armored plate or disk having heat insulating properties and/or a heat-insulating gasket as discussed in the preceding paragraph can be inserted between an abrasion-resistant metallic face plate and the main body of the nozzle plate. Both features are combined to a large extent by using the above-mentioned high alloy chromium-nickel steel. In this manner, the quantity of heat given off to the fluid cooling agent by the nozzle plate and correspondingly the total energy requirements during operation of the device are again reduced still further.

By means of this combination of the inner lining or tubular insert of the invention with a conventional extrusion die of the underwater granulator type or with preferred variations of this die, it is possible for the distributor portion of the die to largely assume the temperature of the molten plastic material and to fully avoid a premature solidification of the molten plastic where it will clog or plug up the extrusion bores of the nozzle plate. Furthermore, it was surprising to find that with such insulation of the distributor portion and the flowing molten plastic from the cooling fluid, the temperature of the nozzle plate as such can indeed drop considerably below the plastic material being processed without causing difficulties in the granulation process.

In order to permit rapid interchanging of a tubular insert, for example to permit the production of different sizes of granules or when shifting from one plastic material to another, it is a particularly desirable feature of the present invention to construct the inner liner as a tubular insert whose outer diameter is spaced radially inwardly from the inner walls or diameter of the corresponding nozzle plate bore and to provide projections or bridging means to hold the tubular insert in position. This permits an annular space or gap around the tubular insert which substantially increases its insulating capacity even when filled with plastic material.

In a further development of the present invention, it was found that a substantial improvement in the condition of the plastic material as it emerges from the nozzle plate can be achieved if the terminal portion of the nozzle bore is left unlined so as to achieve a rapid cooling at this point. In order to produce a granulated plastic material which flows well in the solid state, it has been found that it is necessary to cool only a surface portion of the extruded strand or noodle at precisely that point at which the material is being cut into granules of predetermined length. During the cutting, the plastic material must still possess sufficient heat and plasticity to prevent the formation of a sharp cutting edge or corner on the granules. If this condition is observed, each individual granule or particle will not exhibit edges or squared off corners but will have a highly uniform spherical shape or at least tapered end portions permitting the granules to flow much more freely. When the nozzle bores are unlined or even if they are fully lined, this desirable shape of the cut granules can only be achieved by carefully varying and controlling the extrusion velocity and operating temperatures for every specific thermoplastic material, often with a relatively high expenditure of energy in order to rapidly chill the outer surface layer of the extruded plastic. By only partly lining the extrusion bore and leaving a short unlined terminal portion adjacent the face of the nozzle plate, it is possible to achieve the desired highly fluid granulated material while substantially reducing the consumption of the cooling agent per unit weight or volume of granulated material. This preferred embodiment is explained in greater detail hereinbelow.

Figure 2:
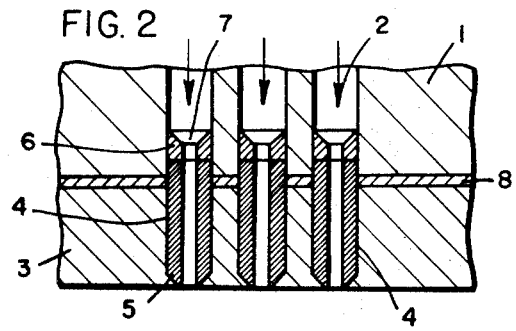

In the drawings, the same reference numeral identifies a particular component of the extrusion die of the invention in all of the figures, even though the shape, proportions or even the location of the component may vary. This will serve to provide a simple comparison of the various different embodiments. As a rule, extrusion dies for underwater granulators contain a large number of nozzle bores or extrusion openings which are often arranged along several circular paths on the face of the die, e.g. three concentric circles. FIGS. 1 and 2 illustrate three such extrusion openings in a radial cross-section through the die, other portions being omitted since the die is otherwise conventional in its construction and arrangement in an underwater granulator. For reasons of simplicity, the remaining figures illustrate only one nozzle bore or extrusion opening except FIG. 13 which is a special construction. It is of course possible to arrange the openings in any arbitrary geometric configuration on the face of the die, but it is preferred to have each bore constructed in the same manner in any particular embodiment. The arrows in all of the figures show the direction of flow of the molten plastic material as it is extruded and granulated. Conventional cutting means sweep across the face of the die at the bottom or base of each figure where the cooling fluid also acts, it being understood that the die need not be positioned vertically.

Each of the dies shown in the figures are of the usual steel construction and each generally has a distributor block or portion 1 which contains one or several annular canals and/or individual distributor channels 2 which uniformly distribute and feed the molten plastic into the nozzle plate 3 which is conventionally connected tightly against the distributor block by means of bolts or screws (not shown). As in the usual extrusion die, strip heaters or other conventional heating means are applied to the distributor portion 1, e.g. around its circumference, in order to maintain the plastic material in the distributor channels 2 at a constant temperature above its solidification temperature. The present invention permits this temperature to be maintained at a much lower point closer to the melting point of the plastic, i.e. the heat supplied to the distributor canal or channels is correspondingly lower.

Referring now to FIG. 1, the nozzle plate 3 is located immediately adjacent to the distributor block 1 and firmly bolted thereto with bores 4 in the nozzle plate in alignment with the distributor channels 2. Inner liners in the form of individual tubes 5 constructed of quartz glass have an upper end which extend a short distance into the distributor channels 2 of the distributor block 1. These tubes 5 can be preformed as tubular glass inserts or they can even be poured in place. If desired, they can be permanently cemented in place. These linings or the liner tubes 5 reduce the heat transfer from the molten material into the nozzle plate 3.

In order to simplify the manufacture or preparation of the liner, it can be separated into two parts as shown in FIG. 2. Thus, the upper end 6 of the liner with a funnel-shaped or conically narrowed inlet 7 can consist of metal or any heat-resistant material in which the funnel-shaped inlet 7 can be easily worked or formed. This upper end 6 can be inserted loosely since the lower conically tapered end of the liner 5 holds the assembly in place under the extrusion pressure exerted in the direction of the arrow. In addition, FIG. 2 illustrates the insertion of a suitable heat-insulating layer or gasket 8, e.g. consisting of asbestos or a similar material having a very low coefficient of heat conductivity. This strongly reduces the transfer of heat from the distributor block 1 to the nozzle plate 3 so that it is possible to continue heating the molten plastic in the distributor channels 2 up to the point at which the melt enters into the feed portion of the lined nozzle plate. Since the rate of heat loss from the distributor block 1 is small, the energy requirements for heating the distributor block, e.g. with electrical heating filaments, is also quite small. For this reason, it is not absolutely essential in this case to have the tubes 5 extend into the distributor channels 2 and the upper feed end 6 need not have a low coefficient of heat conductivity as otherwise required for the liner of the invention, for example as shown in FIG. 3.

Figure 3:
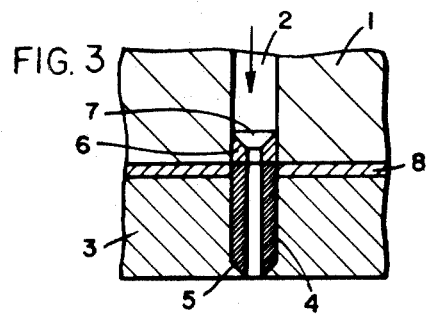
Figure 4:
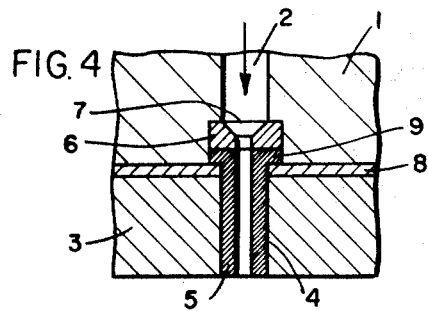

While the inserted tube 5 is supported at its lower conical end in a correspondingly tapered portion of the nozzle plate bore 4 as shown in FIGS. 1–3, it is also possible to support the liner by means of an upper integral flange 9 which can rest on the nozzle plate or preferably on the inserted gasket 8. Where the liner is constructed of glass or a similar brittle ceramic material, it is expedient to recess its lower end a fraction of a millimeter from the face of the nozzle plate 3 rather than have the annular face of this liner flush with the face of the nozzle plate. This is sufficient to prevent the brittle liner tube from being damaged by the cutting knives as they sweep across the face of the nozzle plate.

Figure 5:
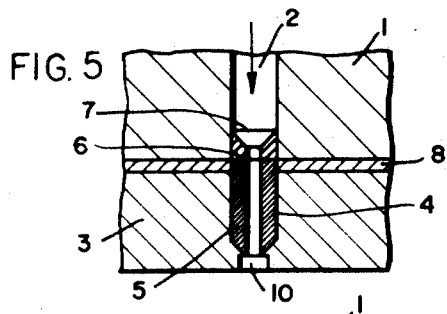

In FIG. 5, another embodiment is shown whereby the liner tube 5 is recessed somewhat further and the inner diameter at the unlined nozzle bore outlet 10 is somewhat larger than the inner diameter of the tubular insert 4 so that the extruded strand or noodle of the plastic does not come in direct contact with the nozzle plate itself. For purposes of illustration, this recessed outlet portion of the nozzle bore and the difference in diameters has been shown on an enlarged scale.

Figure 6:
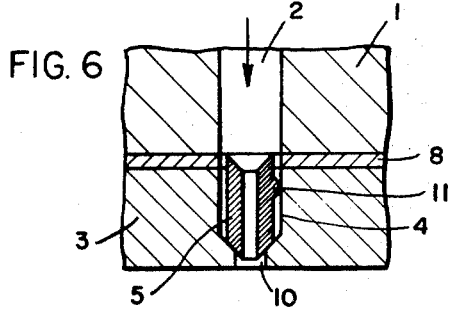

The particular embodiment shown in FIG. 6 differs from all the rest insofar as the inner liner or tubular insert 5 does not fit snugly into the nozzle plate bore 4, but instead it is held concentrically by several, e.g. three lugs, ears or projections 11 on its circumference so as to provide an annular open space between the insert 5 and the inner walls of the bore 4. Such projections or bridging means hold the insert 5 firmly in place without radial play and at the same time facilitates the insertion and removal of the individual liner tubes 5. In the axial direction, the tube 5 rests on a conically tapered annular offset at the bottom in the same manner as in FIGS. 1–3 and 5. This arrangement has another special advantage. Plastic material enters into the annular air gap between the tubular insert 5 and the inner wall of the bore 4, cools down and solidifies in this annular gap to form an additional heat insulation layer between the hot flowing melt and the nozzle plate. Furthermore, by combining the features of FIGS. 4 and 5, i.e. by including both the upper annular flange 9 and the lugs or projections 11, it is possible to maintain a completely open annular air gap between the insert 5 and the inner walls of the bore 4, except for the supporting bridge members 11, thereby providing a highly insulating layer of air around the extruded plastic.

Figure 7:
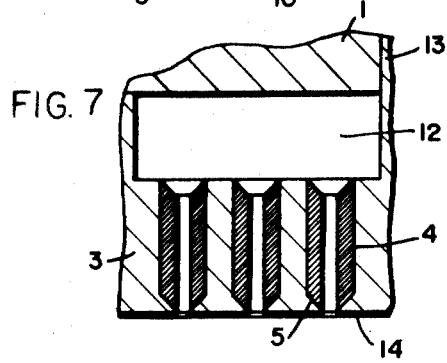

According to FIG. 7, the nozzle bores 4, in which tubular inserts 5 are located, are in fluid connection with a joint or common annular ring or distributor canal 12 worked into the nozzle plate 3. In this case, the nozzle plate 3 and a central deflecting plug 13 acting as an inner core of the distributor portion of the die can be constructed as one integral piece or member. As previously known and following a conventional practice, the front or face of the nozzle plate 3 swept by the cutting or granulating knives can be equipped with a wear-resistant or abrasion resistant metal plate 14.

Figure 8:
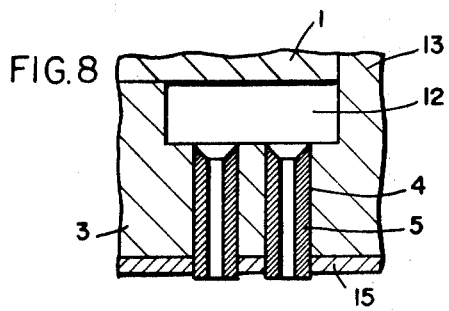

In the embodiment of FIG. 8, the front surface of the nozzle plate 3 is equipped with a plate 15 having the thermally insulating properties of the liner 5 and can consist of a ceramic material. However, for abrasion-resistance it is preferable to construct this plate 15 from one of the thermally insulating, heat-resistant high alloy chromium-nickel steels mentioned above. The liners 5 can terminate flush with the wear-resistant plate 15, or as another alternative shown in FIG. 8, the liners 5 can be extended to a slight extent so as to project from the insulating plate 15 with the granulating knives sweeping directly over the annular faces of the liner tubes 5. In this latter case, the liner tubes 5 are preferably constructed from the above noted high alloy chromium-nickel steel.

In FIGS. 9–16, there are illustrated a number of different embodiments which are directed to a particularly preferred construction of the lined extrusion bores. These embodiments possess a common feature in that the terminal portion 4a of each extrusion bore adjacent the face of the nozzle plate 3 is unlined so as to permit a rapid cooling at this particular point in the flow of the extruded plastic material. As noted above, this construction ensures a precise cooling and solidification of the outer sheath or skin of the extruded strand of plastic so that it can be granulated without causing the formation of sharp edges or corners on the individual granules.

In each of FIGS. 9–16, a distributor block 1 cooperates with the nozzle plate 3, including a central upwardly extending segment 13, to provide an annular distributor channel 16 in fluid connection with the nozzle plate bores 4 by the connecting canal or channel 17 which tapers inwardly in the direction of melt flow. In each case, the nozzle plate 3 contains an upper feed section represented by a bore 4 of relatively large diameter and containing the liner or tubular insert 5 over most of its length. The lower or terminal portion of this nozzle plate bore 4a, which remains unlined, is generally constructed so as to have a substantially smaller diameter, corresponding to the desired dimension of the extruded plastic strand. A number of variations are otherwise shown in these figures of the drawing.

Thus, in FIG. 9, the liner is constructed in three segments 5, 5a and 5b and may be composed of the same or different substances having the required low coefficient of heat conductivity. A simple tubular segment such as 5a is preferably made as a glass insert, e.g., Jena ware, while tapered or radially recessed segments such as 5b can often be more easily made from a preformed fused or sintered refractory or ceramic material or from the heat-insulating high alloy steel. The innnermost diameter of the liner or bushing 5 is equal to the inner diameter of the unlined bore 4a, while the liner segments 5a and 5b provide an even further enlarged inner diameter for the feed of the molten plastic. By comparison to liner segments 5a and 5b, the lowermost segment 5 has a much greater wall thickness because the temperature difference between the melt and the nozzle plate and thus the required insulating effect is greatest as one approaches the cooled face of the nozzle plate. The terminal unlined nozzle bore 4a has in this case a length which is approximately three times its diameter.

By way of example, a plastic material maintained at a melt temperature of 300° C. in the distributor channel 16 proceeds through the nozzle plate 3 in the direction of the arrow, and the melt cools to about 200° C. as it passes the bore 4 lined by segments 5, 5a and 5b, i.e. a temperature drop of about 100° C. Then, a further temperature drop of about 50° C. occurs in the terminal unlined bore 4a, particularly in the outer or surface portion of the melt being extruded. The resulting strand or noodle of the plastic then emerges at the face of the nozzle plate 3 into a cooling bath, e.g. water, with an outer surface temperature of about 150° C., and a further intensive cooling takes place in the bath itself so that the strand is sufficiently solid on the one hand to be cut into granules but still sufficiently plastic or semi-solid towards its core so as to result in freely flowing granules having tapered end segments rather than sharp edges or corners.

The unlined nozzle bore 4a shown in FIG. 10 differs from that of FIG. 9 in that the upper entry portion 18 is conically tapered to provide a funnel-shaped preliminary feed zone which has the effect of providing an initial precooling of the melt and is essentially equivalent to a lengthening of the unlined terminal portion of the nozzle bore. FIG. 10 further illustrates an integral liner 5, i.e. constructed in one piece rather than in several segments, again with a diameter which becomes smaller in stages in the direction of melt flow and with greater insulation as one approaches the face of the nozzle plate.

In FIG. 11, there is illustrated an insertable tubular liner 5 with two outer diameters so that the liner is supported by corresponding radial offsets or steps of the nozzle bore 4 under the pressure of the melt. With this construction, the compressive stress exerted by the liner on the nozzle plate is largely taken up by the first or upper offset where the nozzle plate has sufficient strength to withstand a high load or pressure. In this case, the portion of the nozzle plate between its face and the lower end of the liner is not placed under a heavy load so that it may represent a relatively thin layer or annular section around the terminal portion 4a of the nozzle plate bore.

The terminal bore 4a shown in FIG. 12 is constructed so that it enlarges conically toward the face of the nozzle plate 3. This particular embodiment reduces the pressure resistance of the final extrusion bore and simultaneously reduces the tendency of "freezing," i.e. a premature solidification in this terminal bore. In the lined portion of the bore 4, there are illustrated in this case two liner segments 5 and 5c having the same outer diameter but a conically reduced diameter in the upper segment 5c and a similar conically reduced portion 18 at the lower end of segment 5. As in FIG. 11, the conical portion 18 is contained within the liner rather than being unlined as in FIG. 10.

FIG. 13 represents another useful embodiment in which several unlined bores 4a with upper feed sections 18 are in fluid communication with a single large nozzle plate bore 4 lined with two segments 5 and 5d of the required insulating material.

The arrangement in FIG. 14 is similar to that shown in FIG. 10 except that the integral liner 5 has an inner bore which conically tapers inwardly in the direction of melt flow, the degree of taper being designed to adjust the exact rate of cooling desired in the lined portion of the bore and to achieve a substantially uniform rate of heat transfer over the length of the liner.

A special form of the liner according to the invention is shown in FIG. 15 wherein a lower segment 5 of the liner in the form of a tubular insert has a small outer diameter to provide an open annular space 19 offering a very high degree of insulation. The upper segment 5e is a large ring-shaped insert with its inner diameter or bored opening corresponding to the inner diameter of the lower segment 5 but with its outer diameter corresponding to the nozzle plate bore 4 so that it acts as a plug to close off the annular insulating space 19. The lower segment 5 is held radially in place by its conically tapered ends fitting into correspondingly tapered portions of the nozzle bore 4 and the upper ring-segment 5e. In this case, the lower lined segment 5 is especially well insulated so that solidification cannot occur even with a long extrusion bore of narrow diameter.

Finally, in FIG. 16 there is illustrated a double lining adjacent to the terminal end of the nozzle bore. Within the outer liner 5 having a large wall thickness, there is inserted a smaller bushing 5f which has a fine inner bore corresponding to the diameter of the unlined terminal bore 4a. In the event of some inadvertent damage to the bore lining, this arrangement has the advantage that it is considerably less expensive to replace the small inner bushing 5f than it is to replace a large liner such as 5 with its correspondingly long bore.

The use of an unlined terminal portion of the extrusion bore as illustrated throughout FIGS. 9–16 has the advantage that a very intensive but accurately controlled cooling can be exerted on the plastic material just before it emerges from the face of the nozzle plate while still avoiding any tendency for the plastic to freeze or stick in the extrusion bore. Not only is it possible to properly solidify only the surface or skin portion of the extruded plastic strand, but it is also possible to achieve the desired cooling without using excessive amounts of the cooling medium. The upper lined portion of the nozzle plate bore, on the other hand, reduces the amount of heat which must be supplied to maintain the plastic in molten form as it is distributed and fed toward the extrusion openings.

Thus, depending upon the plastic material being processed and the length of the unlined terminal portion of the extrusion bores, the heating of the extrusion die and particularly the nozzle plate can be partially or even completely avoided after an initial heating required simply to place the device into operation since the nozzle plate rapidly reaches an equilibrium temperature sufficient to maintain the plastic in its molten state and to begin solidification only at the approximate point of extrusion. The enlarged diameter of the lined portion of the extrusion bore is further advantageous because the melt retains more heat in its core and a greater pressure is exerted downwardly against the unlined extrusion bore so that the partly stiffened or semi-rigid plastic strand is unable to stick to the terminal walls. By appropriate design of the liners or tubular inserts, based upon their coefficient of heat conductivity, the preliminary cooling of the hot melt can be very accurately controlled so that the solidification point of the plastic is reached at the wall of the extrusion bore only in the zone which is defined by the unlined terminal portion of the bore.

It will be recognized that the construction and arrangement of the various elements of the extrusion die can be modified in any number of ways without departing from the essential spirit and scope of the present invention. The alternatives offered herein are merely illustrative so as to provide adequate instructions for still other designs or arrangements of parts capable of yielding the desired results. Thus, one can use a single insertable liner or several liner segments or bushings can be assembled together in an axial direction. The liners can be constructed with radial recesses or projections or conically tapered portions along their inner and/or outer diameters with corresponding recesses or projections of the receiving bore of the nozzle plate. Where an air gap or annular space is desired around the extrusion bore of the inner liner, it is merely necessary to provide a bridging member, e.g. one or more radial projecting elements or separate inserts which support the inner liner concentrically within the nozzle plate bore at a spaced interval therefrom. The axial position of the inner liners can be fixed by means of flanges, ears, lugs, conical ends, offset outer diameters or the like, and it is generally unnecessary to fasten or connect the liner to the nozzle plate since it can be held in place by the extrusion pressure of the melt.

The cross-section of the liners or tubular inserts 5 need not be perfectly circular but may also be elliptical, polygonal or profiled in some other manner. In most instances however, circular cross-sections are preferred if only to simplify the design and construction of the liners.

Within the entire scope of the invention, the extrusion bores of the nozzle plate can be lined over their complete length or only partially lined. The preferred embodiments of FIGS. 9–16 are especially useful in achieving a considerable improvement in the extruding and granulating steps of the process. A partial lining is also appropriate, however, if the molten plastic or polymer must be maintained at a disadvantageously high temperature before passing through the nozzle plate and an additional removal of heat in the unlined nozzle bores will promote or improve the solidification for granulating purposes. The use of removable tubular inserts permits the liners to be readily interchanged so as to accommodate different thermoplastic materials and/or a variety of operating conditions.

By proper selection and design of the liner in terms of its length and wall thickness as well as a corresponding appropriate design of the nozzle plate and its axially aligned bores for receiving the liners and/or extruding the plastic, the desired rate of heat transfer can be easily adjusted to optimum conditions for any particular polymer being granulated. As a simple example using an inner liner or insert as in either FIG. 1 or FIG. 9, one can maintain a polyester having a melting point of about 260° C. at a slightly higher temperature of 280° C. in the melt zone corresponding to the distributor bores 2 (FIG. 1) or the distributor channel 16 (FIG. 9). The inner liner 5 can then be designed for use with a cooling bath maintained at 50° C. so that the melting or "freezing" point of the polymer does not occur on the wall surface of the extrusion bore until the melt has been conducted almost to the face of the nozzle plate or just shortly before the face plate in the terminal unlined portion 4a (FIG. 9). Since the exact point at which solidification begins can be accurately controlled and "freezing" can be avoided by this control and/or with other modifications in structure, the extrusion die of the invention provides not only a better granulating process but also much greater flexibility in adapting to a wide range of plastic materials and operating conditions.

The invention is hereby claimed as follows:

1. In an extrusion die for an underwater granulator wherein said die includes a channeled distributor portion in which a synthetic thermoplastic material is maintained in molten form and a nozzle plate portion containing a plurality of elongated bores in fluid connection with at least one distributor channel for extrusion of said thermoplastic material therethrough so as to emerge at the face of the die into a cooling fluid and to be there granulated by cutting means in close proximity to the die face, the improvement which comprises an inner liner over at least part of the length of each extrusion bore, said liner consisting of a heat-resistant material having a high melting point of at least 750° C. and a low value of heat conductivity of not more than about 15 kcal./m. hr. ° C.

2. An extrusion die as claimed in claim 1 wherein said liner is constructed as a bushing capable of being removably inserted into said bore.

3. An extrusion die as claimed in claim 1 wherein said liner extends partly into said distributor portion of the die.

4. An extrusion die as claimed in claim 1 wherein a heat insulating gasket is positioned between said nozzle plate portion and said distributor portion of the die.

5. An extrusion die as claimed in claim 1 wherein the face of the nozzle plate is composed of a heat-resistant high alloy steel having a heat conductivity of not more than about 12 kcal./m. hr. ° C.

6. An extrusion die as claimed in claim 1 wherein a heat insulating gasket is positioned between said nozzle plate and an outer abrasion-resistant face disk.

7. An extrusion die as claimed in claim 1 wherein each inner liner is inserted into its nozzle bore and positioned concentrically therewith by outwardly extending radial projections on the circumference of said liner.

8. An extrusion die as claimed in claim 1 wherein each inner liner is composed of a substance selected from the class consisting of fused silica, fused silicates, fused aluminum oxides and a heat-resistant, high alloy chromium-nickel steel.

9. An extrusion die as claimed in claim 8 wherein said inner liner is composed of glass.

10. An extrusion die as claimed in claim 8 wherein said inner liner is composed of quartz.

11. An extrusion die as claimed in claim 8 wherein said inner liner is composed of porcelain.

12. An extrusion die as claimed in claim 1 wherein each inner liner inserted in its nozzle bore terminates axially a short distance from the extrusion face of said nozzle plate.

13. An extrusion die as claimed in claim 12 wherein the unlined terminal portion of the nozzle bore has an axial length of approximately one and one-half to three times its diameter.

14. An extrusion die as claimed in claim 12 wherein the inner diameter of said inner liner is equal to the diameter of the unlined terminal portion of said nozzle bore.

15. An extrusion die as claimed in claim 12 wherein the inner diameter of said inner liner is recessed radially outwardly as it extends axially away from the face of the nozzle plate.

16. An extrusion die as claimed in claim 12 wherein the outer diameter of said inner liner is recessed radially outwardly as it extends axially away from the face of the nozzle plate.

17. An extrusion die as claimed in claim 12 wherein at least one of the surfaces corresponding to the inner and outer diameter of said inner liner is conically tapered radially inwardly in an axial direction toward the face of the nozzle plate.

18. An extrusion die as claimed in claim 12 wherein each inner liner is composed of a substance selected from the class consisting of fused silica, fused silicates, fused aluminum oxides and a heat-resistant, high alloy chromium-nickel steel.

19. An extrusion die as claimed in claim 1 wherein the outer diameter of each inner liner in the form of a tubular insert is spaced radially inwardly from its nozzle plate bore and held in position by projections bridging the annular space therebetween.

References Cited

UNITED STATES PATENTS

| | | | |
|---|---|---|---|
| 1,310,509 | 7/1919 | Specht | 18—8 |
| 2,839,783 | 6/1958 | De Wolf | 18—8 |
| 3,049,753 | 8/1962 | Ogden et al. | 18—8 |
| 3,067,468 | 12/1962 | Kelley et al. | 18—12 X |
| 3,174,183 | 3/1965 | Siegel | 18—8 |

FOREIGN PATENTS

| | | |
|---|---|---|
| 860,827 | 2/1961 | Great Britain. |
| 1,433,779 | 2/1966 | France. |

WILBUR L. McBAY, Primary Examiner